United States Patent
Creswell et al.

(10) Patent No.: US 12,450,541 B2
(45) Date of Patent: Oct. 21, 2025

(54) SYSTEMS AND METHODS FOR PROVIDING TIERED SUBSCRIPTION DATA STORAGE IN A MULTI-TENANT SYSTEM

(71) Applicant: Zuora, Inc., San Mateo, CA (US)

(72) Inventors: Nathan Creswell, Redwood City, CA (US); Lei Jin, Redwood City, CA (US)

(73) Assignee: Zuora, Inc., Redwood City, CA (US)

(*) Notice: Subject to any disclaimer, the term of this patent is extended or adjusted under 35 U.S.C. 154(b) by 346 days.

(21) Appl. No.: 16/431,665

(22) Filed: Jun. 4, 2019

(65) Prior Publication Data

US 2019/0370720 A1   Dec. 5, 2019

Related U.S. Application Data

(60) Provisional application No. 62/680,581, filed on Jun. 4, 2018.

(51) Int. Cl.
 *G06Q 10/0639* (2023.01)
 *G06F 16/22* (2019.01)
 *G06F 16/28* (2019.01)

(52) U.S. Cl.
 CPC ....... *G06Q 10/06393* (2013.01); *G06F 16/22* (2019.01); *G06F 16/289* (2019.01)

(58) Field of Classification Search
 None
 See application file for complete search history.

(56) References Cited

U.S. PATENT DOCUMENTS

| | | | |
|---|---|---|---|
| 7,418,426 B1 * | 8/2008 | Reunert | G06Q 20/102 |
| | | | 705/40 |
| 7,698,276 B2 * | 4/2010 | Seshadri | G06Q 30/02 |
| | | | 719/318 |

(Continued)

FOREIGN PATENT DOCUMENTS

| | | | | |
|---|---|---|---|---|
| WO | WO-2006076520 A2 * | 7/2006 | | G06Q 40/00 |
| WO | WO-2008016998 A1 * | 2/2008 | | G06Q 10/103 |

(Continued)

OTHER PUBLICATIONS

Khodashenas, Pouria Sayyad, et al. "Service provisioning and pricing methods in a multi-tenant cloud enabled RAN." 2016 IEEE Conference on Standards for Communications and Networking (CSCN). IEEE, 2016. (Year: 2016).*

(Continued)

*Primary Examiner* — Brian M Epstein
*Assistant Examiner* — Derick J Holzmacher
(74) *Attorney, Agent, or Firm* — Fish & Richardson P.C.

(57) ABSTRACT

Receive a first order, the first order being associated with a subscription, and the first order being associated with one or more first order actions. Generate, based on the first order and the one or more first order actions, one or more first order metrics. Generate a multi-tiered subscription data object, a first tier of the multi-tiered subscription data object including the first order, a second tier of the multi-tiered subscription data object including the one or more first order actions, and a third tier of the multi-tiered subscription data object including the one or more first order metrics. Receive a first request for a first report. Generate, based on the one or more first order metrics of the multi-tiered subscription data object, one or more first multi-tiered subscription object reports. Present the one or more first multi-tiered subscription object reports.

16 Claims, 7 Drawing Sheets

(56) References Cited

U.S. PATENT DOCUMENTS

| | | | |
|---|---|---|---|
| 7,921,299 B1* | 4/2011 | Anantha | H04N 21/25875 726/28 |
| 10,467,705 B1* | 11/2019 | Jin | G06Q 40/00 |
| 2003/0191677 A1 | 10/2003 | Akkiraju et al. | |
| 2006/0235831 A1 | 10/2006 | Adinolfi et al. | |
| 2012/0130973 A1 | 5/2012 | Tamm et al. | |
| 2013/0097204 A1 | 4/2013 | Venkataraman et al. | |
| 2013/0138485 A1* | 5/2013 | Zou | G06Q 30/0235 705/14.1 |
| 2014/0012706 A1* | 1/2014 | Foerster | G06Q 30/04 705/26.81 |
| 2014/0075239 A1 | 3/2014 | Prathipati et al. | |
| 2014/0114819 A1* | 4/2014 | Olsen | G06Q 40/12 705/30 |
| 2016/0308963 A1 | 10/2016 | Kung | |
| 2017/0236188 A1* | 8/2017 | Puck | G06Q 30/0635 705/26.81 |
| 2017/0236212 A1* | 8/2017 | Purville | G06Q 40/12 705/30 |
| 2017/0236213 A1* | 8/2017 | Shak | G06Q 40/12 705/30 |
| 2017/0236217 A1* | 8/2017 | Suggula | G06Q 40/12 705/30 |
| 2017/0236218 A1* | 8/2017 | Shak | G06Q 40/12 705/30 |

FOREIGN PATENT DOCUMENTS

| | | | | |
|---|---|---|---|---|
| WO | WO-2008144772 A1 * | 11/2008 | | G06Q 30/0264 |
| WO | WO-2012142343 A2 * | 10/2012 | | H04L 63/104 |
| WO | WO-2013096654 A1 * | 6/2013 | | G06Q 30/04 |
| WO | WO-2014143208 A1 * | 9/2014 | | G06F 16/24556 |
| WO | WO-2018052907 A1 * | 3/2018 | | G06F 16/21 |

OTHER PUBLICATIONS

Lee, JC-K., S. Mohapi, and H. E. Hanrahan. "Service subscription information management in a TINA environment using object-oriented middleware." IEEE Intelligent Network 2001 Workshop. IN 2001 Conference Record (Cat. No. 01TH8566). IEEE, 2001. (Year: 2001).*

Jiang, Zhongbo, et al. "A Pattern-based Design Approach for Subscription Management of Software as a Service." 2009 Congress on Services—I. IEEE, 2009. (Year: 2009).*

Li, Yang, Xuejie Zhang, and Yun Gao. "Object-Oriented Data Synchronization for Mobile Database over Mobile Ad-hoc Networks." 2008 International Symposium on Information Science and Engineering. vol. 2. IEEE, 2008. (Year: 2008).*

Lee, Jimmy Chi-Keng, S. Mohapi, and H. Hanrahan. "Implementation of TINA Service subscription information management using object database and database middleware." (2000). (Year: 2000).*

* cited by examiner

SYSTEMS AND METHODS FOR PROVIDING TIERED SUBSCRIPTION DATA STORAGE IN A MULTI-TENANT SYSTEM

CROSS-REFERENCE TO RELATED APPLICATIONS

The present application claims the benefit of U.S. Provisional Patent Application Ser. 62/680,581, filed Jun. 4, 2018 and entitled "Multi-Tenant System for Providing Tiered Subscription Data Storage," which is hereby incorporated by reference herein.

TECHNICAL FIELD

This disclosure pertains to data storage. More specifically, this disclosure pertains to systems for providing tiered subscription data storage in a multi-tenant system.

BACKGROUND

Under conventional approaches, traditional systems store static order information. For example, such systems may store that five units of a product were sold at $100 per unit. However, these traditional systems cannot effectively store subscription information and/or other event driven information.

SUMMARY

A claimed solution rooted in computer technology overcomes problems specifically arising in the realm of computer technology. In various embodiments, a computing system is configured to generate, store, and utilize multi-tiered subscription data objects. Multi-tiered subscription data objects may each include multiple tiers of subscription information. For example, a first tier may include one or more orders (e.g., an order for cable television service), and/or information describing the one or more orders. A second tier may include one or more order actions (e.g., installation charges, monthly recurring charges), and/or information describing the one or more order actions. A third-tier may include one or more order metrics, and/or information describing the one or more order metrics. For example, the order metrics may include monthly recurring revenue (MRR) for order(s), order action(s) and/or subscription(s); total contract value(s) (TCV) for order(s), order action(s), and/or subscription(s); and/or the like. The system may determine the order metrics based on the first tier, the second tier, and/or the third tier of the multi-tiered subscription data object at the time an order is received (e.g., from a subscriber).

In some embodiments, the system determines the order metrics of a multi-tiered subscription data object solely based on the data of that multi-tiered subscription data object. For example, the necessary data for determining the order metrics may be contained within the multi-tiered subscription data object itself (e.g., in the first tier, the second tier, and/or the third tier), and the system does not need to obtain data records from other locations. This may, for example, be more computationally efficient than traditional systems. For example, other types of systems may have to pull data from many different systems, which may store data in different formats, and/or in different geographic locations, which may cause the other types of systems to suffer from bandwidth and latency issues, data format inconsistencies, and/or the like. The multi-tiered subscription data object may avoid those issues by storing the data in multiple tiers of the same multi-tiered subscription data object.

In some embodiments, the system may generate reports based on the order metrics of a multi-tiered subscription data object. Furthermore, the system may generate the reports in a computationally efficient manner because the order metrics are pre-generated, and the order metrics are stored in the same multi-tiered subscription data object as the order and the order actions. For example, the order metrics may have already been generated and stored in the multi-tiered subscription data object at the time the order was received.

Various embodiments of the present disclosure include systems, methods, and non-transitory computer readable media configured to receive a first order, the first order being associated with a subscription, and the first order being associated with one or more first order actions. Generate, based on the first order and the one or more first order actions, one or more first order metrics. Generate a multi-tiered subscription data object, a first tier of the multi-tiered subscription data object including the first order, a second tier of the multi-tiered subscription data object including the one or more first order actions, and a third tier of the multi-tiered subscription data object including the one or more first order metrics. Receive a first request for a first report. Generate, based on the one or more first order metrics of the multi-tiered subscription data object, one or more first multi-tiered subscription object reports. Present the one or more first multi-tiered subscription object reports.

In some embodiments, the one or more first order metrics are generated in response to the receiving the first order.

In some embodiments, the one or more first multi-tiered subscription object reports are generated in response to receiving the first request for the first report, the first request for the first report being received after the one or more first order metrics are generated.

In some embodiments, the one or more first multi-tiered subscription object reports including at least a portion of the one or more first order metrics.

In some embodiments, the systems, methods, and non-transitory computer readable media are further configured to perform receiving a second order, the second order being associated with the subscription, and the second order being associated with one or more second order actions; generating, based on the second order and the one or more second order actions, one or more second order metrics; modifying the multi-tiered subscription data object based on the second order, the one or more second order actions, and the one or more second order metrics; receiving a second request for a second report; generating, based on the one or more second order metrics of the modified multi-tiered subscription data object, one or more multi-tiered subscription object reports; and presenting the one or more second multi-tiered subscription object reports.

In some embodiments, the one or more second order metrics are generated in response to the receiving the second order.

In some embodiments, the one or more second multi-tiered subscription object reports are generated in response to receiving the second request for the second report, the second request for the second report being received after the one or more second order metrics are generated.

In some embodiments, the one or more second multi-tiered subscription object reports including at least a portion of the one or more second order metrics.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

A claimed solution rooted in computer technology overcomes problems specifically arising in the realm of computer technology. In various embodiments, a computing system is configured to generate, store, and utilize multi-tiered subscription data objects. Multi-tiered subscription data objects may each include multiple tiers of subscription information. For example, a first tier may include one or more orders (e.g., an order for cable television service), and/or information describing the one or more orders. A second tier may include one or more order actions (e.g., installation charges, monthly recurring charges), and/or information describing the one or more order actions. A third-tier may include one or more order metrics, and/or information describing the one or more order metrics. For example, the order metrics may include monthly recurring revenue (MRR) for order(s), order action(s) and/or subscription(s); total contract value(s) (TCV) for order(s), order action(s), and/or subscription(s); and/or the like. The system may determine the order metrics based on the first tier, the second tier, and/or the third tier of the multi-tiered subscription data object at the time an order is received (e.g., from a subscriber).

In some embodiments, the system determines the order metrics of a multi-tiered subscription data object solely based on the data of that multi-tiered subscription data object. For example, the necessary data for determining the order metrics may be contained within the multi-tiered subscription data object itself (e.g., in the first tier, the second tier, and/or the third tier), and the system does not need to obtain data records from other locations. This may, for example, be more computationally efficient than traditional systems. For example, other types of systems may have to pull data from many different systems, which may store data in different formats, and/or in different geographic locations, which may cause the other types of systems to suffer from bandwidth and latency issues, data format inconsistencies, and/or the like. The multi-tiered subscription data object may avoid those issues by storing the data in multiple tiers of the same multi-tiered subscription data object.

In some embodiments, the system may generate reports based on the order metrics of a multi-tiered subscription data object. Furthermore, the system may generate the reports in a computationally efficient manner because the order metrics are pre-generated, and the order metrics are stored in the same multi-tiered subscription data object as the order and the order actions. For example, the order metrics may have already been generated and stored in the multi-tiered subscription data object at the time the order was received.

Figure 1:
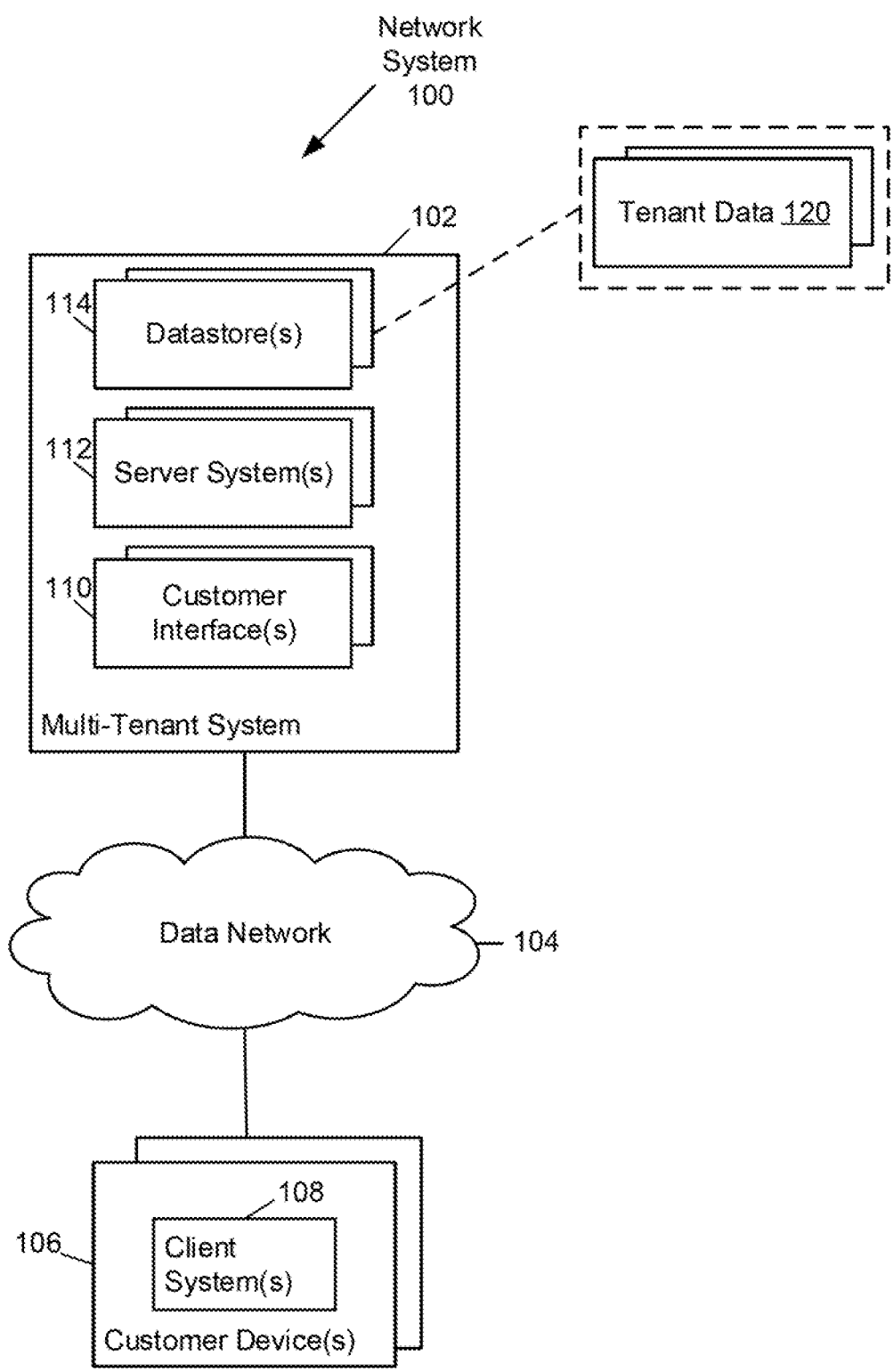
FIG. 1 depicts a diagram of an example network system for providing cloud-based software-as-a-service (SAAS) services of a multi-tenant system to multiple tenants according to some embodiments of the present invention.

FIG. 1 depicts a diagram of an example network system 100 for providing cloud-based software-as-a-service (SAAS) services of a multi-tenant system 102 to multiple tenants according to some embodiments. Examples of the cloud-based SAAS services include data storage, data processing, and business-oriented applications. In some embodiments, each tenant may be a subscription-based entity or provider (e.g., an internet service provider, a home security system and service provider, a cellular phone service provider, or entertainment content provider). Each tenant may include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more products or services of an entity. For example, AT&T internet products may be a particular tenant, and AT&T security products may be another tenant. In some embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, and datastores 114. Each of the client devices 106 includes a client system 108 that accesses the cloud-based SAAS services hosted by the multi-tenant system 102. In some embodiments, the client systems 108 may be operated by employees (e.g., administrator users) of the provider of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, and a datastore tier of multiple datastores 114 for the multiple tenants. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, each tenant may be associated with a subset of the total tenant interfaces 110 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 110 may support load balancing when multiple tenants (and/or multiple customers of tenants) try to access the multi-tenant system 102 concurrently. Further, in some embodiments, each tenant may be associated with a subset of the total server systems 112 for load balancing.

In some embodiments, tenant data 120 for each tenant may be stored in a logical store across one or more datastores 114. In some embodiments, each tenant uses a logical store that is not assigned to any predetermined datastores 114. Each logical store may contain tenant data 120 that is used, generated and/or stored as part of providing tenant-specific business services or functions. In some embodiments, the datastores 114 may include relational database management systems (RDBMS), object-based database systems, and/or the like. In some embodiments, tenant data 120 may be stored across multiple datastores 114, with each datastore dedicated to a particular service (e.g., managing customer records, managing product and/or service consumption information, managing billing information, managing payment information, and/or the like).

In some embodiments, the tenant data 120 may include subscription information, such as billing data and/or subscription status (e.g., active, canceled, suspended, re-activated). Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber. In some embodiments, the tenant data 120 may include usage data (e.g., account activity data), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, and/or cancellation of the application. In some embodiments, account activity may include usage of a product and/or product of a subscriber (e.g., what channels the subscriber actually watches, what services and what level of consumption the subscriber receives, quality of the product and/or services, and/or the like). In some embodiments, the tenant data 120 includes multi-tiered subscription data objects.

In some embodiments, the tenant data 120 may be stored in one or more data formats (or, simply, formats). For example, subscription tenant data may be stored in a particular format, and usage tenant data may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, and/or the like.

The data network (or, communication network) 104 may represent one or more computer networks (e.g., LAN, WAN, or the like) or other transmission mediums. The data network 104 may provide communication between the systems, engines, datastores, components, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2A:
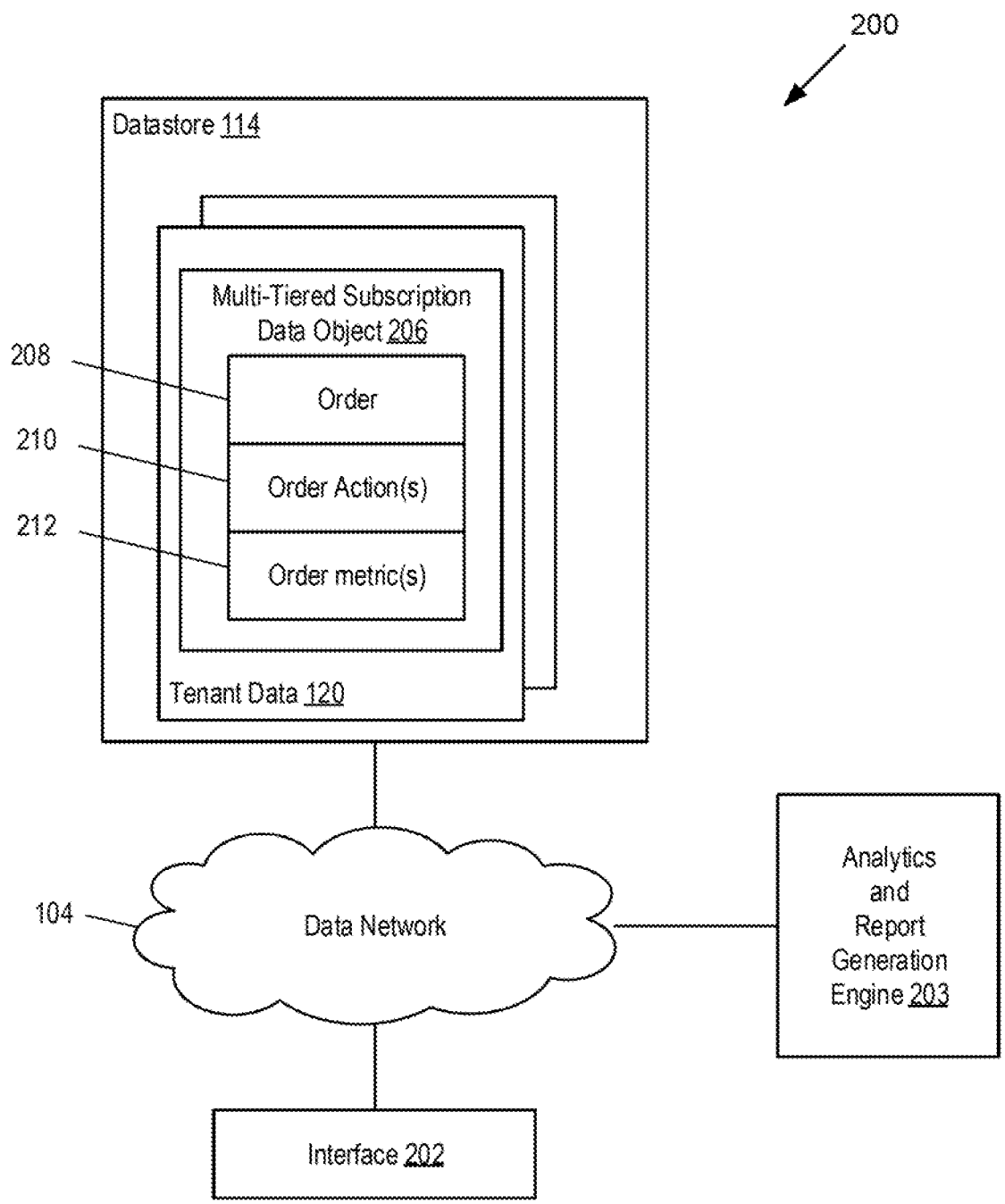
FIG. 2A depicts a diagram of an example portion of the multi-tenant system for enabling multi-tiered storage of subscription data according to some embodiments.

FIG. 2A depicts a diagram of an example portion 200 of the multi-tenant system 102 for enabling multi-tiered storage of subscription data according to some embodiments. The example portion 200 may record changes for subscription information (e.g., financial and billing information) in the multi-tenant system 102 using multi-tiered subscription data objects 206. The example portion 200 uses a strongly typed model to record events or changes, and the effects of those changes, thereby enabling the multi-tenant system 102 to effectively provide accurate financial metrics reporting, including key performance indicators for subscription businesses and/or revenue recognition.

The example portion 200 of the multi-tenant system 102 includes an interface 202 (e.g., which may support internal and/or tenant communications) coupled via the data network 104 to the datastore 114 and to an analytics and report generation engine 203, in accordance with some embodiments. In some embodiments, the datastore 114 includes multi-tiered subscription data objects 206. The multi-tiered subscription data objects 206 may store subscriber data for a one or more subscribers. Each multi-tiered subscription data object 206 may include orders 208, order actions, 210, order metrics 212, and/or information describing orders 208, order actions, 210, and/or order metrics 212. Multi-tiered subscription data objects 206 may be stored in an object-oriented datastore 114.

In some embodiments, a multi-tiered subscription data object 206 may be associated with a single subscription (e.g., a subscription of cable television service). In some embodiments, a multi-tiered subscription data object 206 may be associated with multiple subscriptions (e.g., a subscription to a cable television service and a subscription to a home security service). In some embodiments, one multi-tiered subscription data object 206 may reference (e.g., via a pointer) other information. For example, one or more tiers of a multi-tiered subscription data object 206 may reference data (e.g., order data, order action data, order metric data) in one or more datastores (e.g., relational datastores). In another example, a multi-tiered subscription data object 206 may reference one or more other "linked" multi-tiered subscription data object(s) 206 for overlapping portions of a multiple subscriptions. Accordingly, a modification to one multi-tiered subscription data object 206 may cause a modification in a referenced multi-tiered subscription data object 206. In some embodiments, multi-tiered subscription data objects 206 may be standalone objects, and may not reference other multi-tiered subscription data objects 206 and/or other datastores.

In some embodiments, the orders 208 may include an itemization of the instructions taken on a phone call and/or an online exchange from a subscriber into the multi-tenant system 102. For example, a subscriber on a particular date and at a particular time may conduct an exchange with the multi-tenant system 102 (e.g., via the interface 202) to provide instructions to the multi-tenant system 102 to initiate a first subscription for a first service (e.g., a cable television service) to change the first subscription (e.g., to add or subtract services, to augment or scale back quality of service), to add an additional subscription for a second service (e.g., wireless telephone), termination of services, termination of subscriptions, termination of all subscriptions, and/or combinations of these and/or other changes. Notably, the changes made during the order may take affect retroactively and/or in the future.

In some embodiments, the order actions 210 may include the changes that took effect and/or will take effect. For example, the order actions 210 may include the list of change events caused by the order 208, such as installation charges, monthly charges for each of the services for the new subscription, termination dates for each of the services for the new subscription, monthly charges for the changes made to the new subscription (e.g., whether an increase or a decrease in the subscription charges), termination dates for the changes to the new subscription, and/or the like. The order actions 210 may include renewal, terms and condition, add product, update product, remove product, invoice owner transfer, and/or cancellation.

In some embodiments, the order metrics 212 include metrics which describe the impact of the order action(s) 210 on the subscription and/or the order 208 of a multi-tiered subscription data object 206. The order metrics 212 may include financial metrics including key performance indicators and/or revenue recognition associated with the subscriber, the subscriber's subscription plan, and/or services associated with the subscriber's plan. For example, the key performance indicators may include monthly recurring revenue (MRR), total contract value (TCV), total cost basis (TCB), and/or the like. Order item and extended list price (ELP) may be another unique set of metrics that may be generated. Order item may be used in determining performance obligations in revenue recognition, and ELP may be used in determining standalone selling price (SSP) in revenue recognition.

In some embodiments, the multi-tenant system 102 includes special purpose APIs (e.g., service provider interfaces) utilizing this structure for downstream linkages. For example, an API detailing the billed and unbilled portion of an order may be implemented. An API that details the linkage, for a given invoice, of invoice items to the originating orders 208 and order actions 210 may be implemented. This latter API may be vital for revenue recognition and may be something impossible for larger systems (e.g., Oracle-based systems) to replicate for subscriptions. The example portion 200 of the multi-tenant system 102 may use a modern, special purpose user interface to effectively allow user order entry and changes, creating these order actions and exposing their effects to the user. By utilizing this multi-tiered subscription data object 206 structure of orders 208, order actions 210, and order metrics 212, the example portion 200 of the multi-tenant system 102 can maintain a record of every single event that could have occurred on a subscription and its associated impact, thereby enabling computationally efficient and accurate financial metrics reporting and support for downstream financial systems.

The analytics and report generation engine 203 may include hardware, software and/or firmware for generating the order metrics 212 and for generating reports. It will be appreciated that the analytics and report generating engine 203 may initiate generation of the order metrics 212 automatically and/or based on a schedule. The schedule may include generating or updating the key performance indicators periodically (e.g., hourly, daily, weekly, monthly). The schedule may include generating or updating the key performance indicators after each order, such as after a call with the subscriber in which the subscriber makes a change to the subscriber's subscription plan. The schedule may include generating or updating the key performance indicators upon each change action taking effect. It will be appreciated that different key performance indicators may be generated at different times. For example, total contract value may be generated shortly after, and/or at the same time, a change order is received, and monthly recurring revenue may be generated shortly after, and/or at the same time, a change action takes effect.

Under some approaches, ERP and CRM systems (e.g., Salesforce, Siebel, SAP) use a model of order and order line to record booking events against a contract or subscription. This model breaks, however, because the model has no notion of an event or a change, and cannot determine what change actually occurred on a subscription. These are static concepts that do not represent a change, but instead represent an existing state. These other systems may store, for example, 5 units sold at $20=$100. Because of these systems, and the interdependent systems built on them, these systems cannot change to an event driven model, such as orders and order actions, and thus cannot also store order metrics.

In some embodiments, the structure of the multi-tiered subscription data object 206 (e.g., going from orders to actions to order metrics) may provide a special purpose system and/or model to address storing event driven information, such as change (e.g., creation or modification) information for subscriptions to create and/or make changes to subscriptions. Accordingly, the example portion 200 of the multi-tenant system 102 maintains the ability to group and record multiple subscription changes in a single multi-tiered subscription data object 206, the ability to tie business metrics, booking, billing, and revenue data together in that multi-tiered subscription data object 206, and the ability to calculate time based metrics and store those metrics in the multi-tiered subscription data object 206.

In some embodiments, the interface 202 functions to receive and/or provide orders 208. For example, the interface 202 may generate one or more graphical user interfaces (GUIs), and the user may provide an order through the graphical user interfaces of the interface 202. The interface 202 may function to receive requests. For example, the interface 202 may function to receive a request for a report, and provide the request to the analytics and report generation engine 203. The interface 202 may function to present reports (e.g., reports generated by the analytics and report generation engine 203) through one or more graphical user interfaces of the interface 202.

In some embodiments, the analytics and report generation engine 203 functions to generate multi-tiered subscription data objects 206. The analytics and report generation engine 203 may generate a first tier of the multi-tiered subscription data object 206 to include one or more orders (e.g., an order for cable television service), and/or information describing the one or more orders. The analytics and report generation engine 203 may generate a second tier of the multi-tiered subscription data object 206 to include one or more order actions (e.g., installation charges, monthly recurring charges), and/or information describing the one or more order actions. The analytics and report generation engine 203 may generate a third-tier of the multi-tiered subscription data object 206 to include one or more order metrics (e.g., monthly recurring revenue for particular period of time), and/or one information describing the one or more order metrics.

In some embodiments, reference to an order may include the order itself (e.g., instructions to execute the order and/or cause order actions), and/or information describing the order (e.g., notes and/or metadata describing the order). In some embodiments, reference to an order action may include the order action itself (e.g., instructions to execute the order action), and/or information describing the order action (e.g., notes and/or metadata describing the order action). In some embodiments, reference to an order metric may include the order metric itself (e.g., data attributes and/or values, data relationships), and/or information describing the order metric (e.g., notes and/or metadata describing the order metrics, visualizations such as graphs and/or charts).

In some embodiments, the analytics and report generation engine 203 determines the order metrics 212 based on the first tier, the second tier, and/or the third tier of a multi-tiered subscription data object 206. In some embodiments, the analytics and report generation engine 203 determines the order metrics 212 of a multi-tiered subscription data object 206 solely based on the data of that multi-tiered subscription data object 206. For example, the necessary data for determining the order metrics 212 may be contained within the multi-tiered subscription data object 206 (e.g., in the first tier, second tier, and/or third tier), and the analytics and report generation engine 203 does not need to obtain data records from other locations.

Figure 2B:
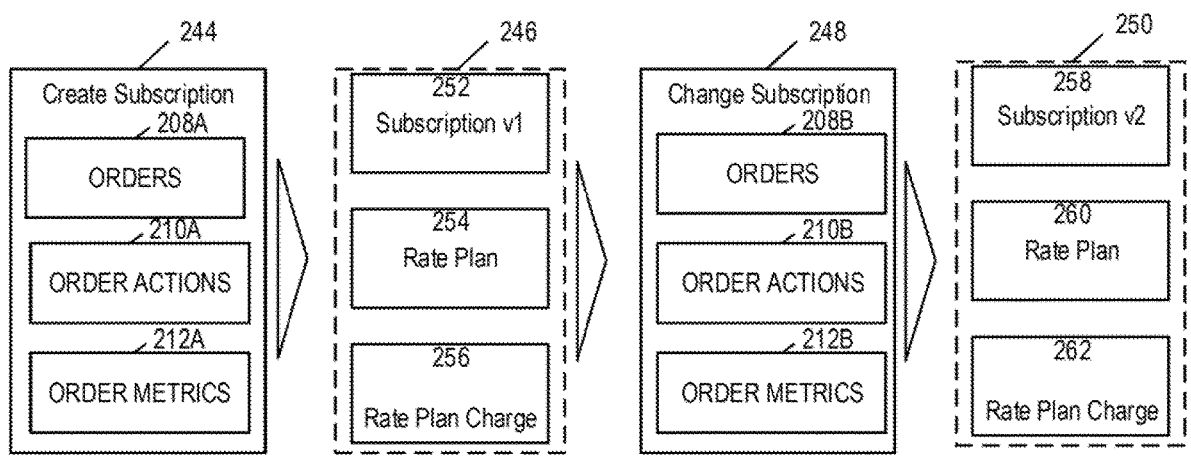
FIG. 2B depicts a diagram of an example multi-tiered subscription data object for receiving an order and creating a first subscription plan, and receiving a change order and creating a second subscription plan according to some embodiments.

FIG. 2B depicts a diagram of an example multi-tiered subscription data object 206 for receiving an order and creating a first subscription plan, and receiving a change order and creating a second subscription plan according to some embodiments.

As shown, the example multi-tiered subscription data object 244 is configured with create order details, including a create order 208A with create order actions 210A (e.g., received from a subscriber). The multi-tiered subscription data object 244 may be an instance of a multi-tiered subscription data object 206. The example multi-tiered subscription data object 244 uses the create order details to generate order metrics 212A. The example multi-tiered subscription data object 244 uses three tiers of create order information to generate a first subscription plan 246, including first subscription details 252, a rate plan 254 and a rate plan charge 256. The first subscription plan 246 becomes the current state of the subscription plan. The order 208A, order actions 210A, order metrics 212A and the first subscription plan 246 are stored in a datastore 114.

As shown, the example multi-tiered subscription data object 248 is configured with change subscription details, including change order 208B with change order action 210B (e.g., received from the subscriber). The example multi-tiered subscription data object 248 may be the same multi-tiered subscription data object as the multi-tiered subscription data object 244, albeit configured with different input values. The multi-tiered subscription data object 244 may be an instance of the multi-tiered subscription data object 206. The example multi-tiered subscription data object 248 uses the change order details to generate order metrics 212B. The example multi-tiered subscription data object 248 uses the three tiers of change order information to modify the current subscription plan (at this time, the first subscription plan 246) and generate a second subscription plan 250, including second subscription details 258, a rate plan 260 and a rate plan charge 262. The second subscription plan 250 may become the current state of the subscription plan. The order 208B, order actions 210B, order metrics 212B and the second subscription plan 250 may be stored in a datastore 114.

In some embodiments, by storing the history of the three-tiers of information and the history of the subscription plans in a multi-tiered subscription data object 206, the analytics and report generation engine 203 may easily and efficiently (e.g., in a computationally efficient manner) generate invoices, key performance indicators, financial reports, revenue recognition, and/or the like.

Figure 3:
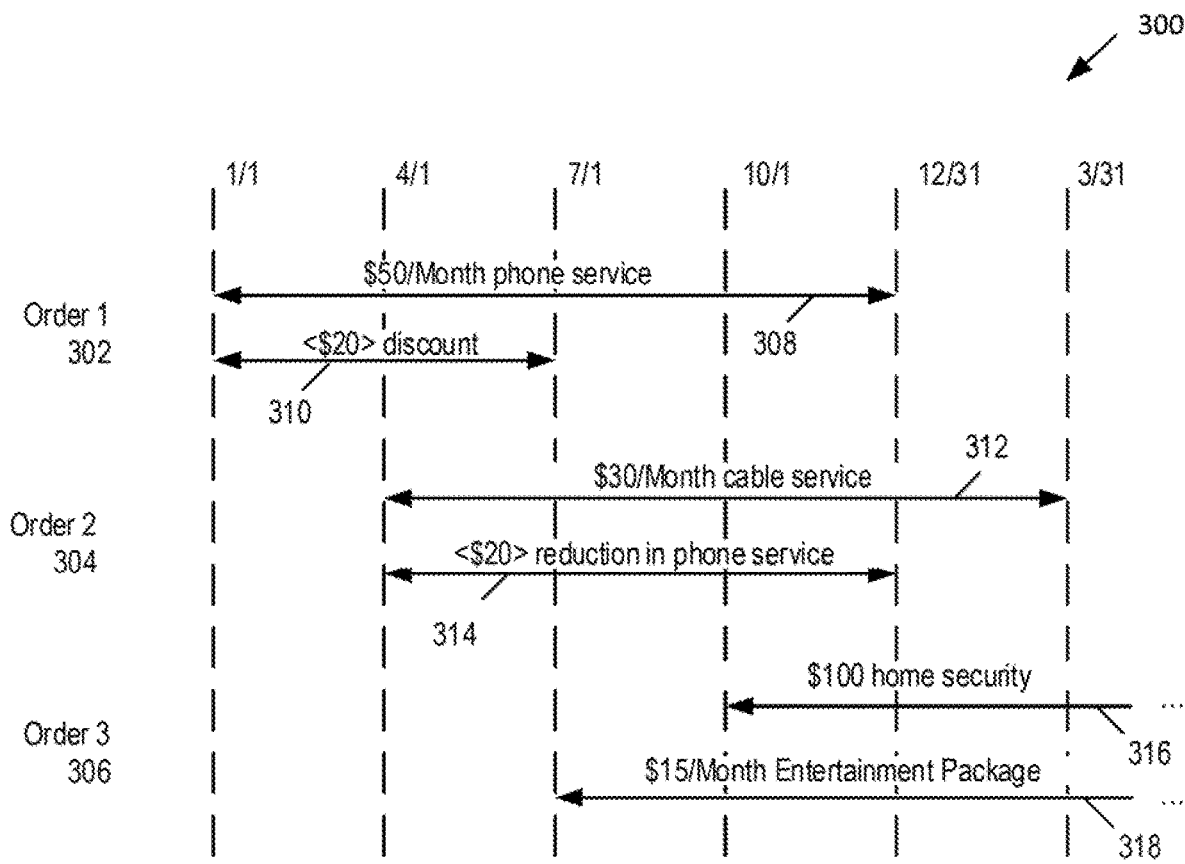
FIG. 3 depicts a diagram of example change order information ready for storage according to some embodiments.

FIG. 3 depicts a diagram 300 of example change order information ready for storage according to some embodiments. In this and other flowcharts and/or sequence diagrams, the diagram illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In the example of FIG. 3, the diagram 300 shows orders 208 and order actions 210. Diagram 300 shows three orders, namely, order one (1) 302, order two (2) 304, and order three (3) 306. Order 1 includes two order actions 210, including a first order action 308 adding a $50/month phone service being added and starting on January 1 and ending on December 31, and a second order action 310 including a $20 discount starting on January 1 and ending on July 1. Order 2 includes two order actions 210, including a first order action 312 adding a $30/month cable service starting on April 1 and ending on March 31, and a second order action 314 reducing the phone service by $20/month starting on April 1 and ending on December 31. Order 3 includes two order actions 210, including a first order action 316 adding a $100/month home security service starting on October 1 and going past December 31 (e.g., possibly for a year or two at the existing price) and a second order action 318 adding a $15/month entertainment package starting on July 1 and going past December 31 (e.g., possibly for a year or two at the existing price). In some embodiments, an order action may be evergreen, in that it has no end date.

In some embodiments, by storing the information as a set of orders 208 and order actions 210, order metrics 212 can be more easily and efficiently (e.g., computationally efficiently) generated. For example, monthly recurring revenue on July 10 can be easily determined by the analytics and report generation engine 203 by adding up the lines on July 10, which as shown would include the $50/month phone service, no discount, $30/month cable service, a $20 reduction on the phone service, and a $15/month entertainment package, for a total monthly recurring revenue (MRR) expectation of $75/month.

Figure 4A:
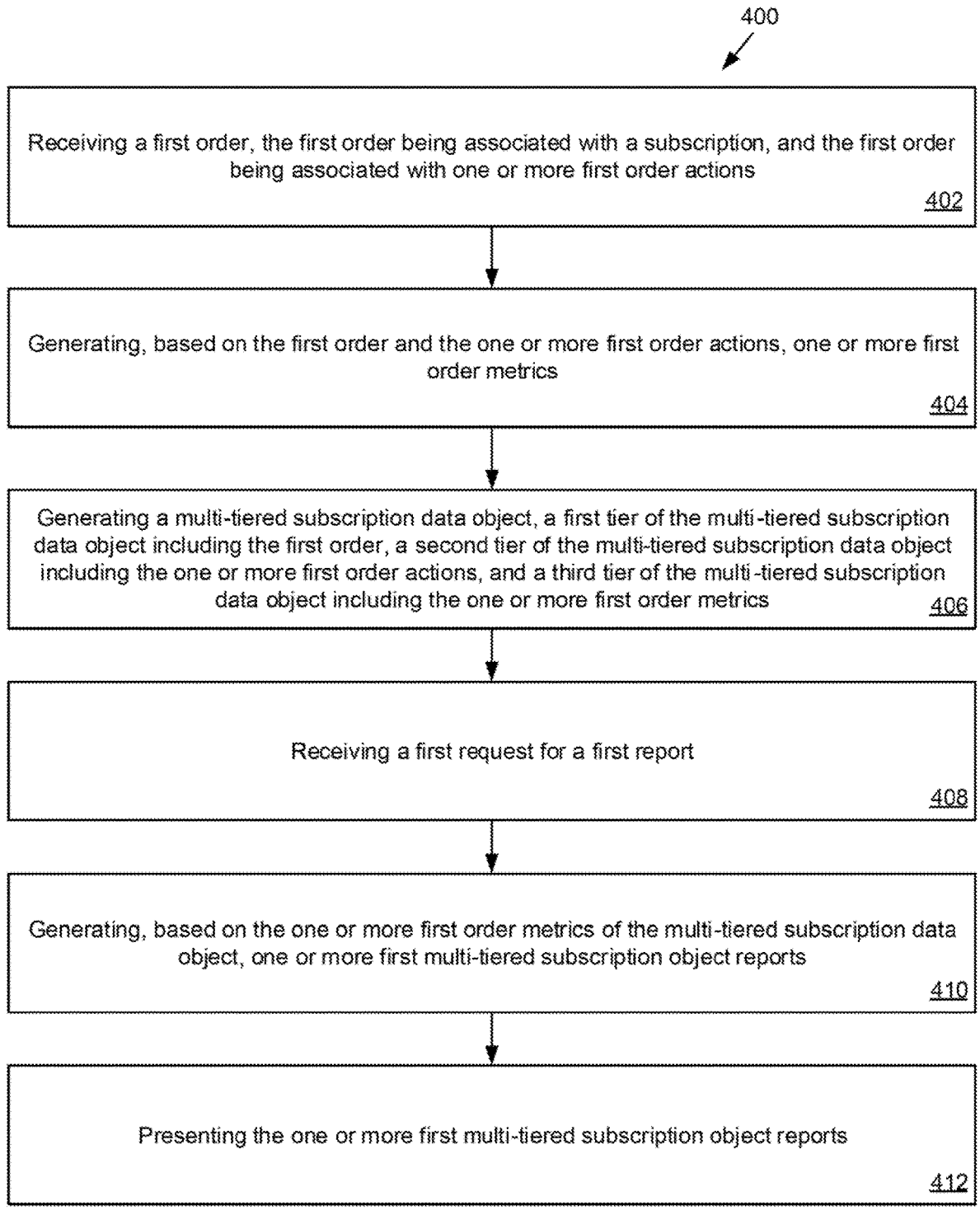
FIGS. 4A-B depict a flowchart of an example of a method of providing multi-tiered subscription data storage in a multi-tenant system according to some embodiments.
Figure 4B:
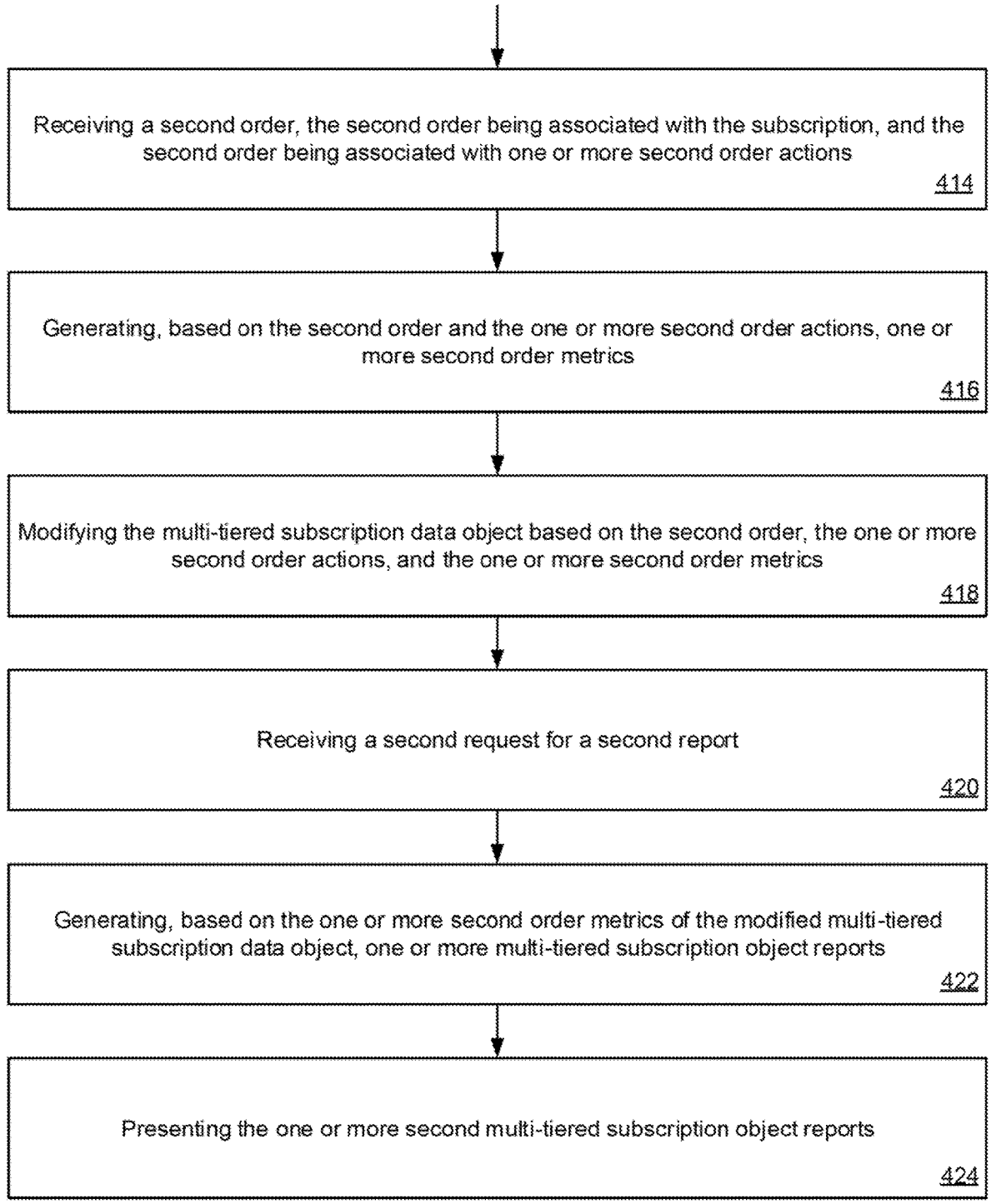

FIGS. 4A-B depict a flowchart of an example of a method 400 of providing multi-tiered subscription data storage in a multi-tenant system according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 402, a multi-tenant system (e.g., multi-tenant system 102) receives a first order (e.g., order 208A). The first order may be associated with a subscription (e.g., cable television), and the first order may be associated with one or more first order actions (e.g., order actions 210A). For example, the first order may be an order (e.g., an online order, a telephone order) for cable television service, and the first order actions may include change events caused by the order, such as installation charges, monthly charges for services(s) of the subscription, and/or the like. In some embodiments, an interface (e.g., interface 202) and/or an analytics and report generation engine (e.g., analytics and report generation engine 203) receives the first order.

In step 404, the multi-tenant system generates, based on the first order and the one or more first order actions, one or more first order metrics (e.g., order metrics 212A). In some embodiments, the analytics and report generation generates the one or more first order metrics. In some embodiments, the one or more first order metrics are generated in response to receiving the first order. For example, the order metrics may be generated at the time an order is submitted by a user, rather than at a later time (e.g., when a user requests a report). Accordingly, when a user requests a report, the order metrics may already be pre-generated.

In step 406, the multi-tenant system generates a multi-tiered subscription data object (e.g., multi-tiered subscription data object 244). The multi-tiered subscription data object may include a first tier that includes the first order, a second tier that includes the one or more first order actions, and a third tier that includes the one or more first order metrics. In some embodiments, the analytics and report generation engine generates the multi-tiered subscription data object.

In step 408, the multi-tenant system receives a first request for a first report. For example, example a tenant user may request a report invoices, key performance indicators, financial reports, revenue recognition reports, and/or the like. In some embodiments, the analytics and report generation engine receives the request.

In step 410, the multi-tenant system generates, based on the one or more first order metrics of the multi-tiered subscription data object, one or more first multi-tiered subscription object reports. For example, the multi-tenant system may obtain the one or more first order metrics from the multi-tiered subscription data object, and include those order metrics in the multi-tiered subscription object report(s). In some embodiments, the analytics and report generation engine generates the multi-tiered subscription object reports.

In step 412, the multi-tenant system presents the one or more first multi-tiered subscription object reports. In some embodiments, the analytics and report generation engine presents the one or more first multi-tiered subscription object reports.

In step 414, the multi-tenant system receives a second order (e.g., order 208B). The second order may be associated with the subscription. The second order may be associated with one or more second order actions. In some embodiments, the second order is received by the tenant interface and/or the analytics and report generation engine.

In step 416, the multi-tenant system generates, based on the second order and the one or more second order actions (e.g., order actions 210), one or more second order metrics (e.g., order metrics 212B). In some embodiments, the analytics and report generation engine generates the second order metrics. In some embodiments, the one or more second order metrics are generated in response to receiving the second order. For example, the order metrics may be generated at the time an order is submitted by a user, rather than at a later time (e.g., when a user requests a report). Accordingly, when a user requests a report, the order metrics may already be pre-generated.

In step 418, the multi-tenant system modifies the multi-tiered subscription data object based on the second order, the one or more second order actions, and the one or more second order metrics. In some embodiments, the analytics and report generation engine modifies the multi-tiered subscription data object.

In step 420, the multi-tenant system receives a second request for a second report. In some embodiments, the analytics and report generation engine receives the second request for the second report (e.g., from a user via the interface).

In step 422, the multi-tenant system generates, based on the one or more second order metrics of the modified multi-tiered subscription data object, one or more multi-tiered subscription object reports. For example, the second report may include change information relative to the first order. In some embodiments, the analytics and report generation engine generates the modified multi-tiered subscription data object.

In step 424, the multi-tenant system presents the one or more second multi-tiered subscription object reports. In some embodiments, the analytics and report generation engine presents the one or more second multi-tiered subscription object reports (e.g., to a user via the interface).

Figure 5:
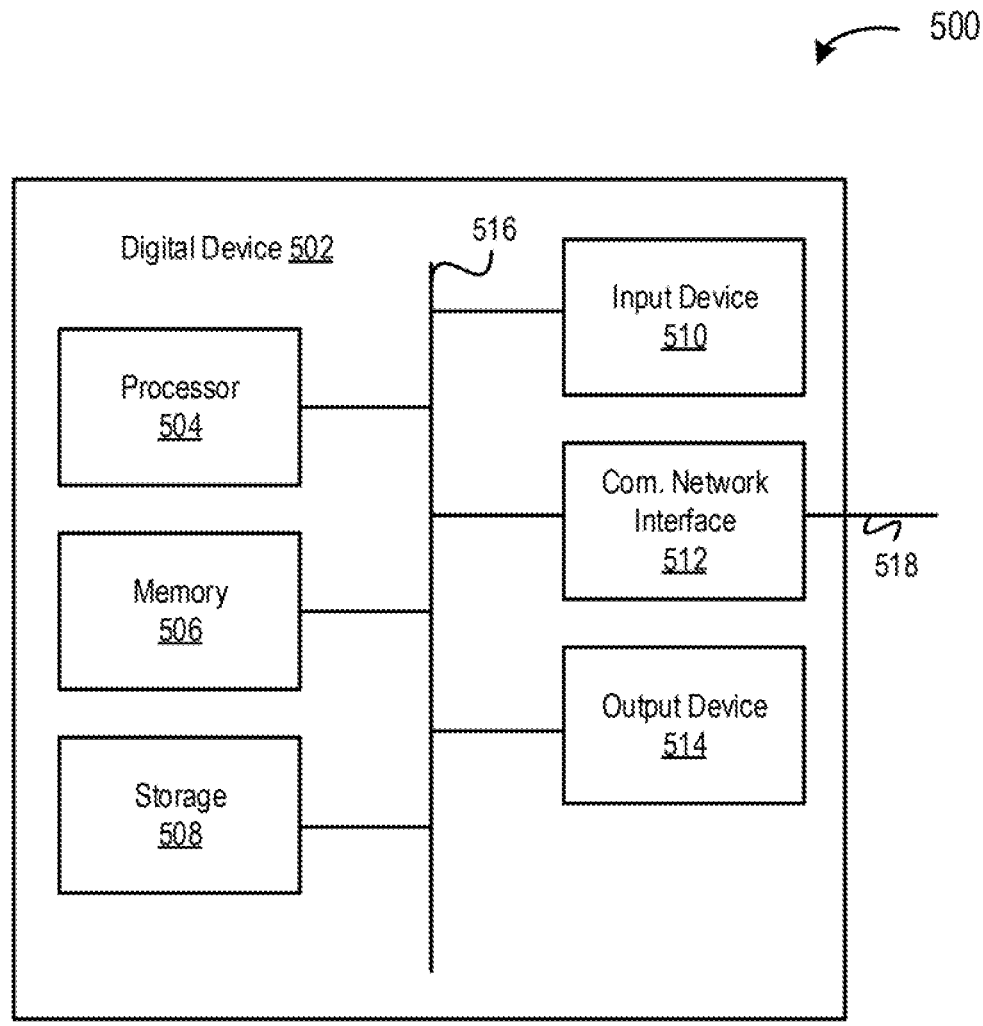
FIG. 5 is a diagram of an example computer system for implementing the features disclosed herein according to some embodiments.

FIG. 5 depicts a diagram 500 of an example of a computing device 502. Any of the systems, engines, datastores, and/or networks described herein may comprise an instance of one or more computing devices 502. In some embodiments, functionality of the computing device 502 is improved to the perform some or all of the functionality described herein. The computing device 502 comprises a processor 504, memory 506, storage 508, an input device 510, a communication network interface 512, and an output device 514 communicatively coupled to a communication channel 516. The processor 504 is configured to execute executable instructions (e.g., programs). In some embodiments, the processor 504 comprises circuitry or any processor capable of processing the executable instructions.

The memory 506 stores data. Some examples of memory 506 include storage devices, such as RAM, ROM, RAM cache, virtual memory, etc. In various embodiments, working data is stored within the memory 506. The data within the memory 506 may be cleared or ultimately transferred to the storage 508.

The storage 508 includes any storage configured to retrieve and store data. Some examples of the storage 508 include flash drives, hard drives, optical drives, cloud storage, and/or magnetic tape. Each of the memory system 506 and the storage system 508 comprises a computer-readable medium, which stores instructions or programs executable by processor 504.

The input device 510 is any device that inputs data (e.g., mouse and keyboard). The output device 514 outputs data (e.g., a speaker or display). It will be appreciated that the storage 508, input device 510, and output device 514 may be optional. For example, the routers/switchers may comprise the processor 504 and memory 506 as well as a device to receive and output data (e.g., the communication network interface 512 and/or the output device 514).

The communication network interface 512 may be coupled to a network (e.g., network 108) via the link 518. The communication network interface 512 may support communication over an Ethernet connection, a serial connection, a parallel connection, and/or an ATA connection. The communication network interface 512 may also support wireless communication (e.g., 802.11 a/b/g/n, WiMax, LTE, WiFi). It will be apparent that the communication network interface 512 may support many wired and wireless standards.

It will be appreciated that the hardware elements of the computing device 502 are not limited to those depicted in FIG. 5. A computing device 502 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 504 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A multi-tenant computing system for storing tenant data as multi-tiered data objects for supporting reduced computer demands during future report generation, the system comprising:
   one or more processors; and
   memory storing instructions that, when executed by the one or more processors, cause the computing system to perform:

receiving an order associated with a subscription plan of a customer account of a particular tenant of multiple tenants of the multi-tenant computing system, the order being associated with one or more associated order actions, the order including a start date and one of an end date or an open-end date, the order capable of including the open-end date;

in response to the order,
   using a data storage model to generate, by a metric-generating service, based on the order and/or the one or more associated order actions, one or more associated order metrics associated with the order, the one or more associated order metrics including key performance indicators derived from the order and/or the one or more associated order actions, the one or more associated order metrics associated with the start date and the one of the end date or the open-end date;
   using the data storage model to generate for the order a multi-tiered subscription data object in a common format, the multi-tiered subscription data object containing a first tier, a second tier and a third tier, the first tier including the order, the second tier including the one or more associated order actions, and the third tier including the one or more associated order metrics; and
   storing the multi-tiered subscription data object in a data storage device in the common format in accordance with the data storage model;

receiving a first request for a first report involving the order and one or more first other orders;

after the receiving the first request for the first report,
   requesting by a report generating service the multi-tiered subscription data object and one or more first other multi-tiered subscription data objects associated with the one or more first other orders from the data storage device;
   transmitting the multi-tiered subscription data object and the one or more first other multi-tiered subscription data objects to the report generating service;
   receiving by the report generating service the multi-tiered subscription data object and the one or more first other multi-tiered subscription data objects from the data storage device; and
   generating by the report generating service the first report, based on the one or more associated order metrics of the multi-tiered subscription data object and on one or more first other associated order metrics of the one or more first other multi-tiered subscription data objects, wherein because the one or more associated order metrics and the one or more first other associated order metrics were stored respectively as part of the multi-tiered subscription data object and the one or more first other multi-tiered subscription data objects the report generating service need not generate the one or more associated order metrics and the one or more first other associated order metrics for generating the first report;

receiving a second request for a second report involving the order and one or more second other orders; and after the receiving the second request for the second report,
   requesting by the report generating service the multi-tiered subscription data object and one or more second other multi-tiered subscription data objects associated with the one or more second other orders from the data storage device;
   transmitting the multi-tiered subscription data object and the one or more second other multi-tiered subscription data objects to the report generating service;
   receiving by the report generating service the multi-tiered subscription data object and the one or more second other multi-tiered subscription data objects from the data storage device; and
   generating by the report generating service the second report, based on the one or more associated order metrics of the multi-tiered subscription data object and on one or more second other associated order metrics of the one or more second other multi-tiered subscription data objects, wherein because the one or more associated order metrics and the one or more second other associated order metrics were stored respectively as part of the multi-tiered subscription data object and the one or more second other multi-tiered subscription data objects the report generating service need not generate the one or more associated order metrics and the one or more second other associated order metrics for generating the second report.

2. The system of claim 1, wherein the data storage device is an object-oriented database.

3. A method being implemented by a multi-tenant computing system including one or more physical processors and storage media storing machine-readable instructions, the method comprising:

receiving an order associated with a subscription plan of a customer account of a particular tenant of multiple tenants of the multi-tenant computing system, the order being associated with one or more associated order actions, the order including a start date and one of an end date or an open-end date, the order capable of including the open-end date;

in response to the order,
   using a data storage model to generate, by a metric-generating service, based on the order and/or the one or more associated order actions, one or more associated order metrics associated with the order, the one or more associated order metrics including key performance indicators derived from the order and/or the one or more associated order actions, the one or more associated order metrics associated with the start date and the one of the end date or the open-end date;
   using the data storage model to generate for the order a multi-tiered subscription data object in a common format, the multi-tiered subscription data object containing a first tier, a second tier and a third tier, the first tier including the order, the second tier including the one or more associated order actions, and the third tier including the one or more associated order metrics; and
   storing the multi-tiered subscription data object in a data storage device in the common format in accordance with the data storage model;

receiving a first request for a first report involving the order and one or more first other orders;

after the receiving the first request for the first report,
   requesting by a report generating service the multi-tiered subscription data object and one or more first other multi-tiered subscription data objects associated with the one or more first other orders from the data storage device;
transmitting the multi-tiered subscription data object and the one or more first other multi-tiered subscription data objects to the report generating service;
receiving by the report generating service the multi-tiered subscription data object and the one or more first other multi-tiered subscription data objects from the data storage device; and
generating by the report generating service the first report, based on the one or more associated order metrics of the multi-tiered subscription data object and on one or more first other associated order metrics of the one or more first other multi-tiered subscription data objects, wherein because the one or more associated order metrics and the one or more first other associated order metrics were stored respectively as part of the multi-tiered subscription data object and the one or more first other multi-tiered subscription data objects the report generating service need not generate the one or more associated order metrics and the one or more first other associated order metrics for generating the first report;
receiving a second request for a second report involving the order and one or more second other orders; and
after the receiving the second request for the second report,
requesting by the report generating service the multi-tiered subscription data object and one or more second other multi-tiered subscription data objects associated with the one or more second other orders from the data storage device;
transmitting the multi-tiered subscription data object and the one or more second other multi-tiered subscription data objects to the report generating service;
receiving by the report generating service the multi-tiered subscription data object and the one or more second other multi-tiered subscription data objects from the data storage device; and
generating by the report generating service the second report, based on the one or more associated order metrics of the multi-tiered subscription data object and on one or more second other associated order metrics of the one or more second other multi-tiered subscription data objects, wherein because the one or more associated order metrics and the one or more second other associated order metrics were stored respectively as part of the multi-tiered subscription data object and the one or more second other multi-tiered subscription data objects the report generating service need not generate the one or more associated order metrics and the one or more second other associated order metrics for generating the second report.

4. The method of claim 3, wherein the data storage device is an object-oriented database.

5. A non-transitory computer readable medium comprising instructions that, when executed, cause one or more processors of a multi-tenant computing system to perform:
receiving an order associated with a subscription plan of a customer account of a particular tenant of multiple tenants of the multi-tenant computing system, the order being associated with one or more associated order actions, the order including a start date and one of an end date or an open-end date, the order capable of including the open-end date
in response to the order,
using a data storage model to generate, by a metric-generating service, based on the order and/or the one or more associated order actions, one or more associated order metrics associated with the order, the one or more associated order metrics including key performance indicators derived from the order and/or the one or more associated order actions, the one or more associated order metrics associated with the start date and the one of the end date or the open-end date;
using the data storage model to generate for the order a multi-tiered subscription data object in a common format, the multi-tiered subscription data object containing a first tier, a second tier and a third tier, the first tier including the order, the second tier including the one or more associated order actions, and the third tier including the one or more associated order metrics; and
storing the multi-tiered subscription data object in a data storage device in the common format in accordance with the data storage model;
receiving a first request for a first report involving the order and one or more first other orders;
after the receiving the first request for the first report,
requesting by a report generating service the multi-tiered subscription data object and one or more first other multi-tiered subscription data objects associated with the one or more first other orders from the data storage device;
transmitting the multi-tiered subscription data object and the one or more first other multi-tiered subscription data objects to the report generating service;
receiving by the report generating service the multi-tiered subscription data object and the one or more first other multi-tiered subscription data objects from the data storage device; and
generating by the report generating service the first report, based on the one or more associated order metrics of the multi-tiered subscription data object and on one or more first other associated order metrics of the one or more first other multi-tiered subscription data objects, wherein because the one or more associated order metrics and the one or more first other associated order metrics were stored respectively as part of the multi-tiered subscription data object and the one or more first other multi-tiered subscription data objects the report generating service need not generate the one or more associated order metrics and the one or more first other associated order metrics for generating the first report;
receiving a second request for a second report involving the order and one or more second other orders; and
after the receiving the second request for the second report,
requesting by the report generating service the multi-tiered subscription data object and one or more second other multi-tiered subscription data objects associated with the one or more second other orders from the data storage device;
transmitting the multi-tiered subscription data object and the one or more second other multi-tiered subscription data objects to the report generating service;

receiving by the report generating service the multi-tiered subscription data object and the one or more second other multi-tiered subscription data objects from the data storage device; and generating by the report generating service the second report, based on the one or more associated order metrics of the multi-tiered subscription data object and on one or more second other associated order metrics of the one or more second other multi-tiered subscription data objects, wherein because the one or more associated order metrics and the one or more second other associated order metrics were stored respectively as part of the multi-tiered subscription data object and the one or more second other multi-tiered subscription data objects the report generating service need not generate the one or more associated order metrics and the one or more second other associated order metrics for generating the second report.

6. The non-transitory computer readable medium of claim 5, wherein the data storage device is an object-oriented database.

7. The system of claim 1, wherein the order is for a new subscription.

8. The system of claim 1, wherein the order is for a change to an existing subscription.

9. The system of claim 1, wherein the one or more associated order metrics includes at least one order metric per order action.

10. The system of claim 1, wherein the one or more associated order metrics are generated at the time the order is received.

11. The system of claim 1, wherein the one or more associated order metrics are generated according to a schedule.

12. The method of claim 3, wherein the order is for a new subscription.

13. The method of claim 3, wherein the order is for a change to an existing subscription.

14. The method of claim 3, wherein the one or more associated order metrics includes at least one order metric per order action.

15. The method of claim 3, wherein the one or more associated order metrics are generated at the time the order is received.

16. The method of claim 3, wherein the one or more associated order metrics are generated according to a schedule.

* * * * *